United States Patent [19]

Grega

[11] 3,863,359

[45] Feb. 4, 1975

[54] REFRACTORY GAS DISTRIBUTOR FOR A FLUIDIZED SOLIDS REACTOR

[75] Inventor: John M. Grega, Pittsburgh, Pa.

[73] Assignee: Dresser Industries, Inc., Dallas, Tex.

[22] Filed: Oct. 29, 1973

[21] Appl. No.: 410,653

[52] U.S. Cl. .................. 34/57 R, 432/58, 23/288 S
[51] Int. Cl. ........................................... F26b 17/10
[58] Field of Search ...... 34/10, 57 R, 57 A; 432/15, 432/58; 23/288 S

[56] References Cited
UNITED STATES PATENTS

| | | |
|---|---|---|
| 3,266,788 | 8/1966 | Jukkola .............................. 34/57 R |
| 3,370,361 | 2/1968 | Guerrieri ............................ 344/57 A |
| 3,462,246 | 8/1969 | Copeland ........................ 34/57 A X |
| 3,508,341 | 4/1970 | Price .................................... 34/57 A |
| 3,653,843 | 4/1972 | Seelander ...................... 34/57 A X |

Primary Examiner—Charles J. Myhre
Assistant Examiner—William C. Anderson
Attorney, Agent, or Firm—Raymond T. Majesko

[57] ABSTRACT

A gas distributor or grid for a fluidized solids reactor having a centrally located cavity or air space, with a second air space lying between the outer periphery of the gas distributor and the reactor wall to accommodate for expansion and contraction of the grid during service.

5 Claims, 3 Drawing Figures

PATENTED FEB 4 1975 3,863,359

REFRACTORY GAS DISTRIBUTOR FOR A FLUIDIZED SOLIDS REACTOR

In a reactor for a fluidized-bed system, certain heat treatment process for effecting the dry fluidization of granular particles is accomplished by their suspension in an upward moving stream of air or gas. Fluidized systems are used for such diverse applications as the drying of ground cement rock, limestone, dolomite, fine coal, blast furnace slag, etc.

A fluidized bed reactor consists of a vertical cylindrical furnace, one or more gas distributors or constriction plates and a fluid bed. The granular solids feed, substantially of 1 micron to 2½ inches in diameter, is introduced above the fluid bed with the treated material being discharged at the same level as or just below the maximum height of the fluid bed. To maintain the solids in a fluidized state, air or gas is blown through the gas distributor. The gas distributor maintains the solids bed above the inlet gas and distributes the air or gas as evenly as possible.

The gas distributor may be of several different designs, each affording its own advantages and disadvantages. Distributors for low temperature (i.e., below 1,800°F, yielding point of Stainless Steel) usually do not present any problems in grid design as they are made from stainless steel. However, gas distributors of this design may not be used in high temperature operations.

In fluidized bed systems where high temperatures are necessary, a gas distributor must be composed of refractory materials. The type of construction was limited because of thermal expansion, thermal cycling, and unresolved stresses. Uneven heat distributions and thermal gradients between the lower surface and upper surface cause the dome to grow similar to that of a bubble. This creates unresolved stresses throughout the gas distributor which cause cracking and spalling of the refractory material. This cracking weakens the structure and considerably reduces the life of the distributor.

Accordingly, it is an object of the present invention to provide a gas distributor of dished and perforated construction which relieves unresolved stresses, increases the refractory life and is able to withstand higher temperatures.

In the drawings, FIG. 1 is an elevation view in cross-section of a portion of a fluidized solids reactor containing the perforated refractory grid or gas distributor of the present invention.

Figure 1:
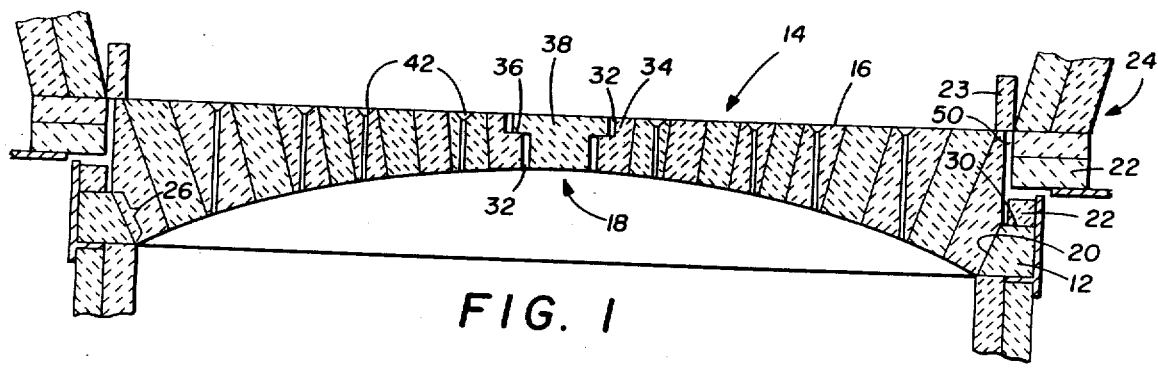
Figure 2:
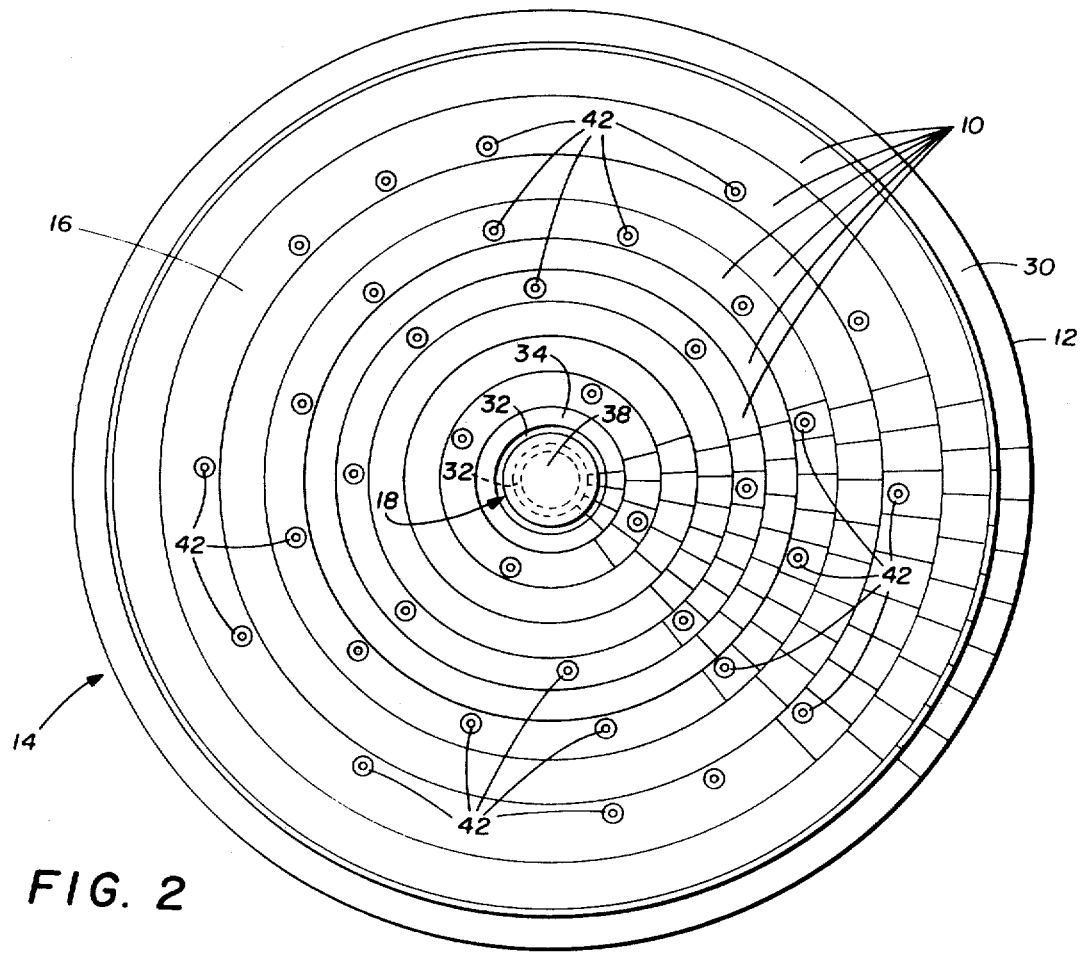
FIG. 2 is a plan view of the construction of FIG. 1.

In accordance with the present invention, there is provided a perforated grid or gas distributor, for a fluidized solids reactor, having an upper and lower surface and composed of a plurality of concentric courses of refractory brick. The upper and lower surface of the grid may be flat or curved, etc. The central or inner course of concentric rings meet to form a free flowing air space which may be partially closed to prevent the solids from discharging through the grid. The outer periphery of the gas distributor is supported on an oblique face or circular course of skewbrick embedded in the sidewalls of the reactor. An additional air space is located between the top inner periphery of the sidewalls and outer periphery of the grid.

Referring to the drawings, there is shown a plurality of concentric rings 10 of refractory shapes arranged circumferentially within a circular skewbrick band 12 to form a downwardly opening dome type dish shaped grid 14 with the upper surface 16 being relatively flat. However, as stated previously, either surface could be flat, curved and the like depending upon the application. Each of the rings is generally comprised of a high quality fired refractory brick. The shapes of the respective brick of each ring are dictated by conventional practice; for example, as shown on pages 507 to 525 of the book "Modern Refractory Practice," Fourth Edition, published by the Harbison Walker Refractories Company in 1961.

The gas distributor 14 contains a centrally located cavity 18 to allow for expansion and contraction of the grid being formed by the inner course of rings 34. The outer periphery of the grid is supported on an oblique face 20, substantially its length 26, of the circular band of skewbrick 12 which is embedded in the refractory sidewalls 22 of the reactor 24. Defined about the outer periphery of the gas distributor by the top face of the skewbrick 30 and the upper surface of the gas distributor is a dead air space 50. The dead air space may be provided by a refractory shape 23 or with a compressible material (i.e., bulk fiber) having the same general configuration.

Figure 3:
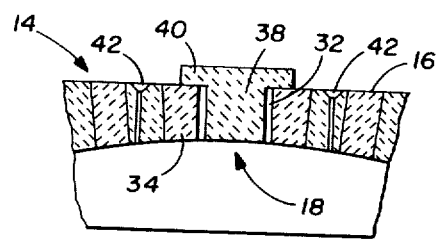
FIG. 3 is an elevation view in cross-section of the central portion of the grid showing a modification of the central opening with respect to FIG. 1.

The central cavity 18 may optionally be covered by a special shape 38. The lower portion of shape 38 has an outside diameter which is less than the inside diameter of the central cavity 18. The upper portion of shape 38 has an extending portion 40 which is larger than the inside diameter of the lower cavity so that is rests on platform 36 (FIG. 1) or upper surface 16 of the grid (FIG. 3). Thus, a concentric dead air space 32 is formed between the plug 38 and inner course of brick 34.

Alternatively, the lower portion of shape 38 may be omitted in either the FIG. 1 or FIG. 3 embodiments.

A number of perforations 42 are provided in the grid between the upper and lower surfaces thereof for the passage of the upwardly moving stream of air or gas. These perforations may be formed by methods well known to those skilled in the art. For example, they may be formed by drilling holes through the brick in the circular courses or by employing brick having mating complementary cutouts which are mated during installation.

It is intended that the foregoing description and drawings be construed as illustrative and not in limitation of the invention.

Having thus described the invention in detail and with sufficient particularity as to enable those skilled in the art to practice it, what is desired to have protected by Letters Patent is set forth in the following claims.

The embodiments of the invention in which an exclusive property or privilege is claimed are defined as follows:

1. In a fluidized solids reactor having sidewalls lined with refractories, a perforated gas distributor or grid having an upper and lower surface and composed of a plurality of concentric courses of refractory brick, the outer periphery of the grid being supported on an oblique face of skewbrick embedded in the sidewalls of the reactor, air space located between the inner periphery of the sidewalls and outer periphery of the grid and an air space in the central portion of the grid formed from the innermost course of refractory brick to allow for expansion and contraction of the grid during service.

2. The reactor of claim 1 in which the central air space is continuous between the upper and lower surfaces of the grid.

3. The reactor of claim 1 in which the central air space is discontinuous between the upper and lower surfaces of the grid.

4. The reactor of claim 2 in which the central air space is closed on the upper surface of the grid to provide a dead air space.

5. The reactor of claim 1 in which the grid has a relatively flat upper surface and a curved lower surface.

* * * * *